Figure 2:
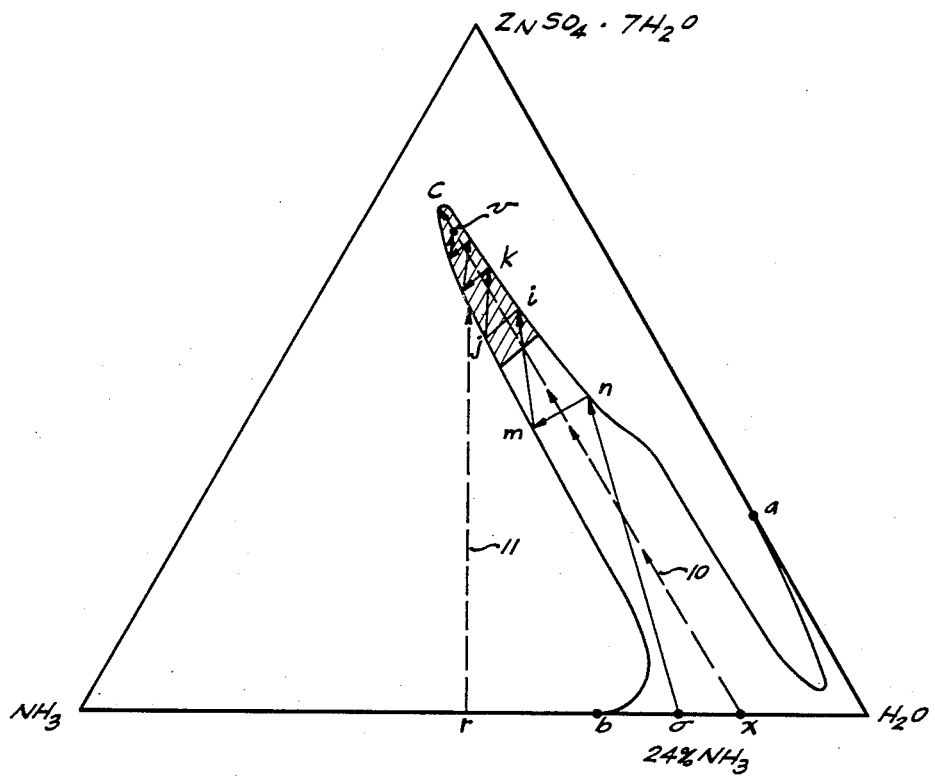

April 21, 1964　　　　D. C. YOUNG　　　　3,130,034
ZINC CONTAINING LIQUID FERTILIZER
Filed Oct. 24, 1960　　　　2 Sheets-Sheet 1
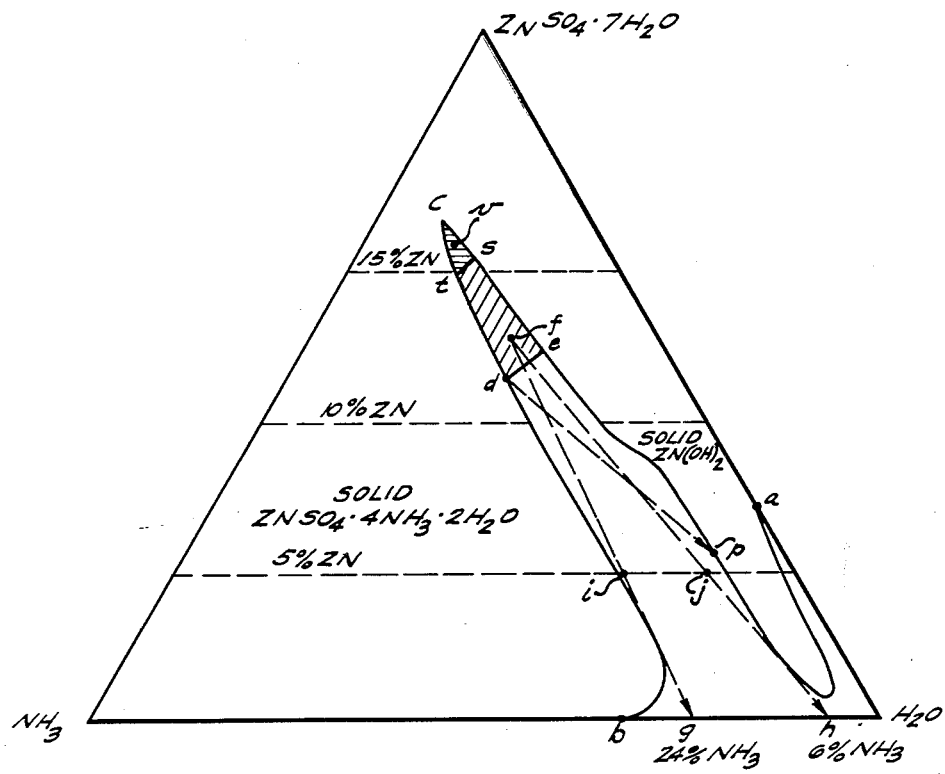
FIG. 1
INVENTOR.
DONALD C. YOUNG
BY
ATTORNEY United States Patent Office 3,130,034
Patented Apr. 21, 1964

3,130,034
ZINC CONTAINING LIQUID FERTILIZER
Donald C. Young, Fullerton, Calif., assignor, by mesne assignments, to Collier Carbon and Chemical Corporation, a corporation of California
Filed Oct. 24, 1960, Ser. No. 64,605
5 Claims. (Cl. 71—1)

This invention relates to liquid fertilizer compositions comprising zinc, nitrogen and sulfur which are substantially noncorrosive to ferrous metals. This invention also relates to liquid concentrates of the aforementioned fertilizers.

A zinc deficiency in the soil is a common cause of poor plant growth. Zinc deficiencies can be remedied by applying a solid zinc salt to the soil directly or in admixture with other necessary plant nutrients such as superphosphate, ammonium nitrate, potassium chloride, etc. The addition of zinc salts to these solids is generally not satisfactory as the zinc salts render the solid fertilizers hygroscopic and hence difficult to store and handle.

The application of zinc to the soil in aqueous solution is preferable to its application in solid form because of the ease with which liquids can be stored, handled and applied to the soil. For such use, however, it is important that the aqueous solutions be noncorrosive to permit the use of mild steel equipment. It is also necessary to maintain a high concentration of plant nutrients, e.g., greater than about 20 weight percent for economical shipment and to avoid the necessity of repeated applications to the soil during the growing season. The concentration of such solutions is generally limited by the minimum temperature expected to be encountered in storage or handling of the solution, generally about 0° to 5° centigrade. Unfortunately, aqueous solutions of zinc salts, such as the commonly available zinc sulfate heptahydrate are corrosive to mild steel and form relatively large quantities of scale and rust. Additionally, zinc salts have a limited solubility, the aforementioned zinc sulfate heptahydrate having a maximum solubility in water of 30 weight percent at 0° C. or expressed in terms of the plant nutrients, about 7 weight percent zinc and about 3 weight percent sulfur for a total of only about 10 weight percent nutrients. Zinc salts also have insufficient solubility in aqueous solutions of ammonium salts to permit their incorporation in these conventional liquid fertilizers.

It is an object of this invention to provide aqueous solutions of zinc salts which are substantially noncorrosive to ferrous metals and which contain a desirable high content of dissolved plant nutrients at a salting out temperature of no greater than about 0° to 5° centigrade.

I have found that relatively large amounts of zinc sulfate (up to about 73 weight percent as the heptahydrate) can be dissolved in aqua ammonia to provide solutions having salting out temperatures no greater than about 0° C. The resultant aqua ammonia solutions of zinc sulfate are substantially noncorrosive to mild steel at ambient temperatures.

I have also found that relatively large amounts of other plant nutrients such as urea, ammonium nitrate, ammonium chloride, and ammonium sulfate can be added to the aqua ammonia-zinc sulfate solutions of my invention without raising their salting out temperature and without rendering the solutions prohibitively corrosive to mild steel. This discovery is quite unexpected in view of the previously mentioned limited solubility of zinc salts in saturated ammonium salt solutions. I have also observed that the aqua ammonia-zinc sulfate solutions of ammonium salts have appreciably lower vapor pressures than do ammoniacal ammonium salt solutions of equivalent concentration.

My invention will now be described by reference to the drawings of which:

FIGURE 1 illustrates the preferred compositions of my invention on the ternary diagram for the ammonia-zinc sulfate heptahydrate-water system; and FIGURE 2 illustrates the method of making compositions of my invention by use of the ternary diagram.

Referring to FIGURE 1, there exists a region of very limited solubility of zinc sulfate in aqua ammonia shown as the area beneath isotherm a—c—b of FIGURE 1. To the right of this region is the solid $Zn(OH)_2$ phase; to the left of the region is a solid phase comprising a zinc sulfate ammonium complex salt. The horizontal broken lines extending across the diagram represent 5, 10 and 15 weight percent of zinc.

The maximum solubility of zinc sulfate heptahydrate at 0° C. in water is represented by point a at 29.6 weight percent, corresponding to only about 6.8 weight percent zinc. This solution, as all aqueous solutions of zinc sulfate, is corrosive to ferrous metals. As the system becomes alkaline with addition of ammonia, the solubility of the salt sharply decreases to a minimum at about 2.5 weight percent, then with the addition of more ammonia, the solubility rapidly increases until a maximum solubility of about 74 weight percent of the salt is reached. At this maximum solubility, point c, the addition of only a slight amount of ammonia, e.g., about 3 to 6 weight percent, sharply decreases the salt solubility to about 5 weight percent zinc sulfate heptahydrate. Continued addition of ammonia will salt substantially the entire zinc content out of the solution.

In general, any of the liquid compositions within isotherm a—c—b of FIGURE 1 are satisfactory for application to the soil to correct zinc deficiencies. These compositions are noncorrosive to ferrous metals and remain free of scale and rust when in contact with ferrous metals. The solutions can therefore be applied and handled with mild steel equipment. The selection of any particular liquid composition in regard to its zinc and nitrogen content depends to a large extent on the nature of the soil and crop as apparent to those skilled in the art. Satisfactory solutions can contain between about 0.5 and about 17 weight percent zinc and between about 7 and about 18 weight percent nitrogen, although for ease in application the more dilute material, i.e., between about 1½ to about 5 weight percent zinc can be employed. The latter liquid solutions can be prepared by the addition of zinc sulfate heptahydrate or its aqueous solutions to aqua ammonia of a strength between about 6 and about 25 weight percent ammonia.

Mixed liquid fertilizers containing additional plant nutrients can be obtained by incorporating nutrients such as urea, ammonium nitrate, ammonium sulfate and ammonium chloride in the liquid compositions falling within the isotherm a—c—b of FIGURE 1. In this manner, balanced liquid fertilizers containing a majority of the plant requirements can be obtained. The solubility of these materials in the aqua ammonia-zinc sulfate solutions and the noncorrosivity of the mix are very surprising in view of the fact that zinc sulfate is only slightly soluble in aqueous solutions of these materials, e.g., only about 1 weight percent of the salt can be added to an ammonium nitrate solution without raising its salting out temperature. Additionally, the resultant material is highly corrosive. In contrast, as much as about 18 weight percent ammonium nitrate can be dissolved in the aqua ammonia-zinc sulfate solutions of my invention such as that represented by point v of FIGURE 1. In general, the mixed liquid fertilizers of my invention comprise aqua ammonia-zinc sulfate solutions having between about 1½ and about 17 weight percent zinc and between about 7 and about 18 weight percent nitrogen and having added thereto between about 1 and about 20 weight percent of urea, ammonium nitrate, ammonium sulfate and ammonium chloride.

For economical shipment, I prefer to employ the concentrated solutions such as shown by the shaded area, e—c—d. In general, these compositions can comprise between about 50 to 74 weight percent; preferably between about 55 and 74 weight percent zinc sulfate heptahydrate and between about 14 and 21 percent ammonia, although to minimize the bulk for shipment, I prefer that the compositions be within the shaded area designated as s—c—t, corresponding to a minimum zinc sulfate heptahydrate content between about 64 and 68 weight percent and an ammonia content between about 16 and 20 weight percent. To these concentrate compositions, other plant nutrients can be added in any desired amount up to the following maximum:

| | Parts [1] |
|---|---|
| Urea | 25 |
| Ammonium nitrate | 22 |
| Ammonium sulfate | 18 |
| Ammonium chloride | 12 |

[1] Expressed as parts by weight per 100 parts of aqua ammonia-zinc sulfate solution.

Because the preferred concentration for shipment is generally greater than that preferred for application to the soil, it is frequently necessary to dilute the concentrates before application to the soil. This is readily achieved without raising the solution's salting out temperature above the preferred minimum of about 0° to 5° C., by dilution with aqueous ammonia having a concentration between about 6 and about 25 weight percent. Preferably, aqueous ammonia of about 20 to about 24 weight percent strength is employed to obtain the maximum content of plant nutrients in the final solution. Referring to FIGURE 1, the changes in solution which occur upon dilution with each of the limiting strengths of aqueous ammonia is illustrated by dilution of a concentrate represented at point $f$ having 58 percent zinc sulfate heptahydrate and 17 percent ammonia. Dilution of composition $f$ with 24 percent strength ammonia proceeds along line $f$—$g$; a composition so obtained containing 5 percent zinc being represented by point $i$, with about 21 percent ammonia. Dilution of $f$ with 6 percent strength ammonia proceeds along line $f$—$h$; a composition so obtained and having 5 percent zinc being represented by point $j$, with only about 10 percent ammonia.

Dilution of the concentrate with water to obtain a solution having no less than about 6 percent zinc is possible and this is shown on FIGURE 1 by dilution of the composition represented by point $d$. As shown, a concentrate $d$ can be diluted to a zinc content of about 6 weight percent with water to provide the composition indicated at point $p$ having a salting out temperature no greater than about 0° C.

Referring now to FIGURE 2, the methods of preparing concentrate compositions of my invention will be described. FIGURE 2 is a ternary diagram for the zinc sulfate heptahydrate-water-ammonia system at atmospheric pressure and 0° centigrade. The solubility of the system is not substantially affected by temperature and therefore the depicted isotherm for 0° C. substantially represents the system at the preferred mixing temperature between about 10° to 40° C. During mixing there occurs an exothermic heat of solution which in the absence of cooling will cause about a temperature rise of 16° to 40° centigrade.

In general, I prefer to prepare the compositions while operating entirely with a single liquid phase, i.e., within the liquid area beneath line $a$—$c$—$b$. I prefer to prepare the concentrate from ingredients commonly available such as the solid zinc sulfate heptahydrate salt, anhydrous ammonia, water and aqua ammonia having about 24 to 25 weight percent ammonia, corresponding to a "20-0-0" designation. The first of these materials are at the terminal points of FIGURE 2; the latter is represented by point $o$. To an aqueous solution of ammonia such as $o$ is first added the zinc salt, then anhydrous ammonia, followed by stepwise alternate addition of the zinc salt and ammonia. Each of these stepwise additions approaches the maximum solubility of the system until the desired concentrate composition is achieved. This stepwise addition is illustrated in FIGURE 2 as follows:

The zinc salt is first added to composition $o$ until the liquid composition reaches a point where continued addition of the salt will cause solids to precipitate. This limiting composition is shown by point $n$.

To composition $n$ is thereafter added anhydrous ammonia until composition $m$ is reached. The ammonia addition is stopped at this point, for any further addition will cause the formation of solid precipitates or when the system temperature is above the melting point of the solid, the formation of an immiscible liquid layer.

The zinc salt is again added to the liquid to change its composition from that at $m$ to that at point $i$, within the preferred concentrate range. Composition $i$, on a weight basis, contains about 15 percent ammonia, about 58 percent zinc salt and about 27 percent water. In terms of plant nutrients its nitrogen content is about 12.5 percent, its sulfur content about 6.5 percent and its zinc content about 13 percent for a total plant nutrient content of about 32 percent. Continued stepwise addition of ammonia and the salt results in compositions $j$, $k$, and ultimately $v$. When it is desired to provide urea, ammonium nitrate, ammonium sulfate and/or ammonium chloride in these solutions, these nutrients can be added to the final aqua ammonia-zinc sulfate solution or can be continuously added during the aforedescribed mixing procedure.

It will be apparent to those skilled in the art that other methods of preparing the concentrate compositions can be employed. Rather than stepwise addition, the ingredients can be continuously metered and blended in the proper proportions to achieve the desired composition. This method is illustrated by broken line 10 wherein an aqueous ammonia solution represented by point $x$ is continuously blended with the solid zinc salt and anhydrous ammonia to achieve composition $c$. The zinc salt and anhydrous ammonia in the following proportions, in parts by weight are mixed with aqua ammonia:

| | |
|---|---|
| Anhydrous ammonia | 1 |
| Zinc sulfate heptahydrate | 4.9 |

Because this method involves the simultaneous metering and blending of a solid, a liquid and a vapor stream it is considerably more difficult than the preferred stepwise addition method.

When pressure vessels are available which are equipped with suitable mixing facilities it is possible to prepare my compositions while passing through the multi-phase region to the left of line $c$—$b$. In this technique, anhydrous ammonia and water can be charged to a suitable vessel under about 1 to 25 atmospheres of pressure to attain a composition such as that represented by point $r$ at about 52 weight percent ammonia. The maximum temperature of mixing that can be employed depends on the maximum pressure permissible with the equipment, which depends on the vapor pressure of the aqua ammonia. For composition $r$ the following relationship exists.

| Pressure, atmospheres: | Temperature, °C. |
|---|---|
| 2 | 10 |
| 4 | 30 |
| 6 | 42 |
| 8 | 52 |
| 10 | 60 |

A sufficient amount of zinc sulfate heptahydrate is mixed with the aqua ammonia to attain a concentrate composition. The change in composition thereby achieved is shown by broken line 11 extending from point $r$ to the concentrate range. In practice, the mixing conveniently could be accomplished by charging the solid to the vessel and thereafter adding the necessary amount of water and ammonia in the following proportions in parts by weight:

| | |
|---|---|
| Zinc sulfate heptahydrate | 100.0 |
| Water | 25.8 |
| Ammonia | 28.0 |

The following will illustrate aqua ammonia-zinc sulfate solutions of my invention:

Table 1

| Composition | Zinc | Nitrogen | Sulfur | Total | Salting Out Temp., °F. | Corrosion Rate at 80° F. |
|---|---|---|---|---|---|---|
| 1 | 2 | 17 | 1 | 20 | 20 | 9 |
| 2 | 2 | 16 | 1 | 19 | 16 | 9 |
| 3 | 4 | 14 | 2 | 20 | 9 | 7 |
| 4 | 3.7 | 13 | 1.8 | 18.5 | 1 | 6 |
| 5 | 10.0 | 11.2 | 4.9 | 26.1 | 32 | 2 |
| 6 | 10.0 | 17.3 | 4.9 | 32.2 | 32 | 2 |
| 7 | 15.9 | 14.8 | 7.8 | 38.5 | 32 | Nil |

Amounts expressed in weight percent.
Corrosion rate in mils per year.

To demonstrate the high solubility of the aforementioned aqua ammonia-zinc sulfate solutions for other plant nutrients, urea, ammonium nitrate, ammonium sulfate and ammonium chloride were added to the highly concentrated composition 7 of Table 1. The following compositions having a salting out temperature no greater than 32° F. were thus obtained:

Table 2

| Composition | Zinc | Nitrogen | Sulfur | Total | Other Nutrient | Corrosion Rate at 80° F. |
|---|---|---|---|---|---|---|
| 8 | 12.7 | 21.3 | 6.2 | 40.2 | 20.4 Urea | Nil |
| 9 | 13.0 | 18.3 | 6.4 | 37.7 | 17.8 NH₄NO₃ | Nil |
| 10 | 14.2 | 16.0 | 7.0 | 37.2 | 10.7 NH₄Cl | Nil |
| 11 | 13.5 | 15.7 | 10.3 | 39.5 | 15.1 (NH₄)₂SO₄ | 24 |

Amounts expressed in weight percent.
Corrosion rate in mils per year.

To determine the corrosivity of solutions of my invention the electrical resistance method was employed. In this method, the increase in electrical resistivity incurred by corrosion of a steel probe immersed within the solution is measured. A description of this method and the apparatus employed appears in Oil In Canada, August 24, 1959, by A. J. Freedman and R. C. Canapary. The corrosivity of the zinc sulfate aqua ammonia solutions was determined both under total and alternate immersions. In the total immersion test, the corrosion probes were continuously immersed in the solution for about 100 hours. In the alternate immersion test, the probes were immersed into and withdrawn from the solution once every two minutes throughout a period of about 100 hours. No measurable difference in the corrosion rates of the aqua ammonia-zinc sulfate solutions of my invention was detected between these test methods.

From Tables 2 and 3 it can be seen that all the solutions tested with the exception of composition 11 had corrosion rates less than about 10 mils per year. Composition 11, containing ammonium sulfate had a slightly higher corrosion rate, 24 mils per year; however this corrosion rate would not prohibit storage and shipment of the solution in mild steel equipment.

The aqua ammonia-zinc sulfate solutions of my invention were also observed to have appreciably lower volatility than solutions of similar concentration having no zinc solute. A comparison of the following results illustrates this property with the initial boiling points of the solutions:

Table 3

| Composition | Zinc Sulfate Heptahydrate | Ammonia | Ammonium Nitrate | Water | Initial Boiling Point, °F. |
|---|---|---|---|---|---|
| 12 | None | 24 | None | 76 | 102 |
| 13 | None | 21.7 | 65.0 | 13.3 | 77 |
| 14 | 57.6 | 14.8 | 17.7 | 9.9 | 177 |

Amounts expressed in weight percent.

For comparison to other liquid fertilizers containing zinc, the following solutions were made: Zinc sulfate heptahydrate was added to an ammonium nitrate solution of concentration commonly used for soil fertilization. Only about 1 percent of the zinc salt could be added without raising the salting out temperature of the solution. Zinc in chelated form was also added to several ammonium salt solutions. The maximum solubility of the zinc chelate at 0° C. and the corrosion rates of the solutions are shown in the following table.

Table 4

| Liquid Fertilizer [a] | Zinc Solute | Solubility of Zinc Solute at 0° Centigrade | Corrosion Rate, Mils Per Year |
|---|---|---|---|
| Ammonium Nitrate (20-0-0) | Zn·SO₄·7H₂O | 1.1 | 152 |
| Do | Zn chelate [b] | 37.6 | 59 |
| Aqua Ammonia (20-0-0) | do | 39.0 | 15 |
| Ammonium Phosphate (8-24-0) | do | 6.7 | 56 |
| Ammonium Phosphate chloride (4-12-0-10) | do | 1.8 | 51 |

[a] Concentration expressed in typical fertilizer designations, in weight percent of the following ingredients in their respective order: nitrogen, phosphorus as P₂O₅, potassium as the oxide, and halogen.
[b] Chelate of zinc ion with the sodium salt of ethylene-diamine-tetraacetic acid.

From Table 4 it can be seen that the use of a chelating agent to solubilize zinc in liquid ammonium salt fertilizers is not desirable because of the high corrosivity of the resulting solutions. Dissolution of zinc sulfate in ammonium nitrate is similarly unsatisfactory because of the high corrosion rate of the resultant solution. In contrast, dissolution of zinc sulfate in aqua ammonia provides zinc solutions which are substantially noncorrosive to mild steel and ferrous metals.

The foregoing examples are solely for illustration of my invention and are not to be construed as limiting of my invention which consists of the features, or their equivalents, set forth in the following claims.

I claim:

1. The method of forming an aqueous solution of zinc sulfate and ammonia from aqua ammonia having a concentration between about 6 and about 24 weight percent ammonia, zinc sulfate heptahydrate, water and anhydrous ammonia which comprises: (1) adding said zinc sulfate heptahydrate to said aqua ammonia until further addition causes the formation of a solid and thereafter (2) discontinuing the addition of said zinc sulfate and adding anhydrous ammonia to the solution, discontinuing the addition of said ammonia when the continued addition of ammonia causes a solid to form in said solution, thereafter repeating steps (1) and (2) in sequence until a composition of greater than about 50 weight percent zinc sulfate calculated as the heptahydrate in aqua ammonia is obtained.

2. The method of preparing dilute fertilizer solutions from an aqueous solution of zinc sulfate and ammonia having greater than about 50 weight percent zinc sulfate as the heptahydrate while avoiding the formation of objectionable precipitates which comprises adding to said solution aqua ammonia having a concentration of ammonia between about 6 and 24 weight percent.

3. A solution for use as a plant nutrient which is non-corrosive to ferrous metals and which consists essentially of a solution of zinc sulfate in aqua ammonia, said solution comprising between 16 and about 20 weight percent of ammonia and between about 55 and about 74 weight percent of zinc sulfate heptahydrate, said solution also containing per each 100 parts an additional plant nutrient selected from the class consisting of 1 to about 25 parts by weight urea, 1 to about 22 parts by weight ammonium nitrate, 1 to about 18 parts by weight ammonium sulfate and 1 to about 12 parts by weight ammonium chloride.

4. The solution of claim 3 wherein said additional plant nutrient is ammonium nitrate.

5. The method of claim 1 wherein said zinc sulfate heptahydrate, water and anhydrous ammonia are simultaneously blended in a ratio of about 25.8 parts of water and about 28 parts of ammonia per 100 parts of said zinc sulfate heptahydrate.

References Cited in the file of this patent

UNITED STATES PATENTS

| | | |
|---|---|---|
| 2,350,982 | Borst | June 13, 1944 |
| 2,637,441 | Woodman | May 5, 1953 |
| 2,809,749 | Corneil | Oct. 15, 1957 |
| 2,899,052 | Van Ness | Aug. 11, 1959 |
| 2,929,700 | Bennett | Mar. 22, 1960 |

OTHER REFERENCES

Agricultural Chemicals, "Zinc Induced . . . Its Counteraction," Caro et al., January 1960, pp. 34–37 and 95.

"Solubilities of Inorganic and Metal Organic Compounds," vol. 1, 3rd edition, Seidell, page 1595.